US006926117B2

(12) United States Patent
Sterling

(10) Patent No.: US 6,926,117 B2
(45) Date of Patent: Aug. 9, 2005

(54) MUFFLER FOR PNEUMATIC HAND TOOL

(75) Inventor: Robert E. Sterling, Colbert, WA (US)

(73) Assignee: Exhaust Technologies, Inc., Spokane, WA (US)

(*) Notice: Subject to any disclaimer, the term of this patent is extended or adjusted under 35 U.S.C. 154(b) by 94 days.

(21) Appl. No.: 10/675,151

(22) Filed: Sep. 29, 2003

(65) Prior Publication Data

US 2004/0055815 A1 Mar. 25, 2004

Related U.S. Application Data

(63) Continuation-in-part of application No. 09/825,384, filed on Apr. 2, 2001, now Pat. No. 6,668,971, which is a continuation-in-part of application No. 09/431,294, filed on Oct. 29, 1999, now Pat. No. 6,209,678, which is a continuation-in-part of application No. 09/316,451, filed on May 21, 1999, now abandoned, which is a continuation of application No. 09/082,293, filed on May 19, 1998, now Pat. No. 5,909,016, which is a continuation-in-part of application No. 08/999,588, filed on Jan. 13, 1998, now Pat. No. 5,952,623.

(51) Int. Cl.[7] .............................. F01N 1/10; F01N 7/02
(52) U.S. Cl. ....................... 181/230; 181/232; 181/229; 181/238; 181/222
(58) Field of Search ................................ 181/230, 229, 181/232, 238, 222

(56) References Cited

U.S. PATENT DOCUMENTS

| 3,526,293 A | | 9/1970 | Hayes et al. |
| 3,667,571 A | | 6/1972 | Fattelay |
| 3,675,732 A | | 7/1972 | Rosen et al. |
| 3,719,251 A | | 3/1973 | Fedrick |
| 3,811,251 A | | 5/1974 | Gibel |
| 3,823,795 A | * | 7/1974 | Fleigle ........................ 181/230 |
| 3,842,932 A | | 10/1974 | Gibel |
| 3,880,245 A | | 4/1975 | Anderson, Jr. |
| 3,880,252 A | | 4/1975 | Mucka |
| 3,896,897 A | | 7/1975 | Hillbush, Jr. |
| 4,033,428 A | | 7/1977 | Wennerstrom |
| 4,082,160 A | | 4/1978 | Schilling et al. |
| 4,093,110 A | * | 6/1978 | Johnson ........................ 227/9 |
| 4,134,472 A | | 1/1979 | Trainor |
| 4,184,564 A | | 1/1980 | Trainor |
| 4,205,732 A | | 6/1980 | Auerbach et al. |
| 4,258,798 A | | 3/1981 | Campbell et al. |
| 4,367,807 A | | 1/1983 | Fink et al. |

(Continued)

FOREIGN PATENT DOCUMENTS

| EP | 0 084 598 A1 | 8/1983 |
| EP | 0 127 550 A2 | 12/1984 |
| FR | 1.519.853 | 4/1968 |
| FR | 2.570.759 | 3/1986 |
| GB | 1 432 048 | 4/1976 |
| TW | 417559 | 1/2001 |

Primary Examiner—Shih-Yung Hsieh
(74) Attorney, Agent, or Firm—Christensen O'Connor Johnson Kindness PLLC

(57) ABSTRACT

A muffler for quieting the operation of a pneumatic tool. In one embodiment the muffler (630) is disposed within a volume defined by a peripheral wall (612) that receives an exhaust stream. An upper plate (631) having several open tubes (632) is disposed in the volume. Each tube is has an intermediate blocking plate (634). A plurality of sound-deadening panels (636) is disposed below the upper plate. The panels have apertures that slidably engage the tubes. A lower plate (650) is disposed below the tubes. The lower plate includes a plurality of apertures (657). One or more diffuser panels (652, 654) is disposed beneath the lower plate. An external exhaust vent (670) closes the volume. In operation, the exhaust enters the volume, is directed through the tubes, then into the sound-deadening panels, back into the tubes, and through the diffuser panels.

20 Claims, 12 Drawing Sheets

U.S. PATENT DOCUMENTS

| | | | |
|---|---|---|---|
| 4,565,259 A | 1/1986 | Stoll | |
| 5,097,924 A | 3/1992 | Reeves | |
| 5,355,673 A | 10/1994 | Sterling et al. | |
| 5,418,339 A | * 5/1995 | Bowen et al. | 181/230 |
| 5,500,494 A | 3/1996 | Ligman | |
| 5,581,055 A | 12/1996 | Self et al. | |
| 5,731,556 A | 3/1998 | Gardner et al. | |
| 5,767,459 A | 6/1998 | Sell | |
| 5,847,334 A | 12/1998 | Taga | |
| 5,909,016 A | 6/1999 | Sterling | |
| 5,952,623 A | 9/1999 | Sterling | |
| D432,891 S | 10/2000 | Sterling | |
| 6,209,678 B1 | 4/2001 | Sterling | |
| 6,425,412 B2 | 7/2002 | Sterling | |

* cited by examiner

MUFFLER FOR PNEUMATIC HAND TOOL

CROSS-REFERENCES TO RELATED APPLICATIONS

This application is a continuation-in-part of U.S. application Ser. No. 09/825,384, filed Apr. 2, 2001 now U.S. Pat. No. 6,668,971, which is a continuation-in-part of U.S. application Ser. No. 09/431,294, filed Oct. 29, 1999 (which issued as U.S. Pat. No. 6,209,678), which is a continuation-in-part of U.S. application Ser. No. 09/316,451, filed May 21, 1999, now abandoned, which is a continuation of U.S. application Ser. No. 09/082,293 filed May 19, 1998, issued as U.S. Pat. No. 5,909,016, which was a continuation-in-part of U.S. application Ser. No. 08/999,588, filed Jan. 13, 1998 (which issued as U.S. Pat. No. 5,952,623)—all of which are hereby incorporated by reference.

FIELD OF THE INVENTION

The present invention relates to acoustics and sound modifying means for muffling and filtering air and, more particularly, to devices for muffling and filtering air exhausted from pneumatically-operated hand tools, equipment, machines, and the like.

BACKGROUND OF THE INVENTION

Pneumatic hand tools are commonly used in industrial and residential settings. Various types of pneumatic hand tools are available, including ratchets, drills, wrenches, grinders, sanders, etc. Known hand tools typically include a handle having a hollow internal chamber. The chamber includes an air intake passage and an air exhaust passage. Each passage extends between a motor and an opening in the bottom surface of the handle. The portion of the intake passage located near its respective handle opening includes components adapted to connect to a standard air coupler or the like. The coupler is in communication with a pressured air supply source. The exhaust passage opens to the atmosphere. When exhaust air is vented from the hand tool, a considerable amount of noise and particulate debris is generated, potentially causing auditory and/or respiratory damage to the operator and others located nearby.

Although ear plugs and facemasks are available to workers, they are often not used for a number of reasons—most typically, because they are not convenient. Numerous attempts have been made by hand tool manufacturers, therefore, to reduce the amount of noise and particles generated by the hand tool itself. These attempts include designing quieter and cleaner motors and designing hand tool components that suppress noise and trap waste prior to expulsion from the hand tool. For example, U.S. Pat. No. 5,418,339 describes a pneumatic hand tool having an exhaust port filled with a web of non-woven fibers coated with a binder resin. These types of mufflers have had some success in muffling sound, but there is often an increase in back pressure to the motor, causing a decrease in the operating efficiency of the hand tool. The operating efficiency of a tool is typically measured in the operating speed of the motor in revolutions per minute (rpm) at a certain gauge pressure.

Cylindrical canister-type combination muffler and air filters are known for large machines, such as hoists and presses. For example, U.S. Pat. No. 4,134,472 describes a combination muffler and air filter having a central tubular member with a number of slots. The tubular member is surrounded by a disposable canister having inner and outer perforated rigid cylinders encasing a series of stacked annular filter members. Exhaust air passes through the inner cylinder, into the filters, and out the outer cylinder. These devices are not typically used for hand tools, however, because of they are large, heavy, and difficult to maneuver.

Thus, there exists a need for a noise muffling system that can reduce sound levels and remove entrained solid and liquid contaminates from the exhausted air before it is discharged to the atmosphere. The ideal device would effectively muffle and filter the exhaust air without creating substantial amounts of back pressure. This would allow a hand tool to be operated without jeopardizing performance of the pneumatic tool over long periods of usage. The ideal muffling system would further attach to a hand tool body and remain attached even during significant tool vibrations. In addition, it would be desirable to have a muffler that can be easily attached to existing pneumatic hand tools. The present invention is directed to fulfilling these needs and others as described below.

SUMMARY OF THE INVENTION

In accordance with aspects of the present invention, a muffler improvement for quieting exhaust expelled from a pneumatic hand tool is provided. The hand tool has a handle with an exhaust passage including a main section. The muffler includes an inner tube having distal and proximal ends and a plurality of holes. A cutoff wall is located below at least one hole in the inner tube. The cutoff wall forces exhaust air to exit the inner tube via the at least one hole located thereabove. The muffler further includes a number of dividers fixedly and spacedly positioned about the inner tube. Each divider extends outward from the inner tube exterior surface a distance less than the width of the main section. The combination of the inner tube and dividers is located within the main section. An end cap is attachable to the handle for closing off the exhaust passage. At least one of the end cap and the handle includes an exit opening. During hand tool use, exhaust air enters the inner tube proximal end, flows out the inner tube holes, moves around the number of dividers, and flows out the exit opening. The tortuous movement of the exhaust air slows it and assists in dampening any attendant noise.

In one embodiment of the invention a muffler assembly is disposed within a peripheral wall extending from the exhaust outlet of a pneumatic tool, the wall defining an open distal end, an upper plate, having one or more apertures fits within the volume defined by the wall. A number of tubes extending the upper plate, each tube having an open upper end, an open lower end, an apertured sidewall, and an intermediate blocking element between the upper and lower ends of the tube. One or more sound-deadening panels are provided, slidably engaging the tubes, and a perforated exhaust plate closes the lower end of the peripheral wall.

In an aspect of the invention, the muffler assembly produces a tortuous path for the exhaust air that directs the exhaust air, at least in part, through the sound deadening material, and reduces the sound generated by the pneumatic tool.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is a muffler for use in quieting exhaust expelled from a pneumatic hand tool. The present invention is compact, lightweight, and easy to use. In select embodiments, the muffler is adapted for immediate connection to known pneumatic hand tools, with only minimal changes required to the hand tools. A number of embodiments of the present invention are described below with reference to the accompanying drawings. It should be appreciated that these embodiments are provided to illustrate various features of the present invention, and thus should not be viewed as limiting with regard to the specific combination of their configurations.

Figure 1:
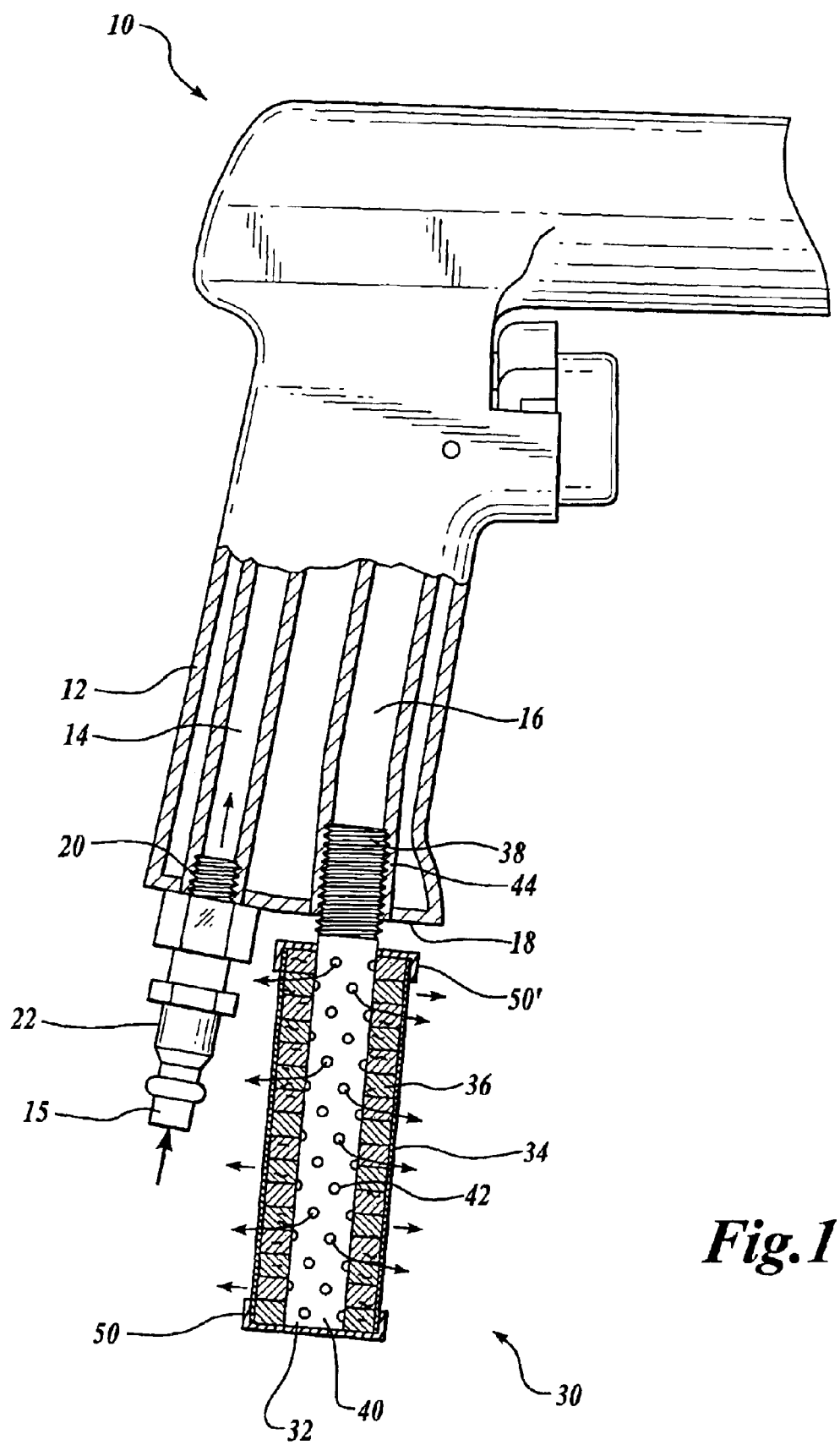
FIG. 1 is a partial cross-sectional side view of a first embodiment of a muffler formed in accordance with the present invention.

Referring to FIG. 1, a pneumatic hand tool 10 generally includes a handle 12 within which an air intake passage 14 and an air exhaust passage 16 extend to and end at respective openings in the bottom surface 18 of the handle 12. The air intake passage 14 opening includes threads 20 adapted to connect to an air supply line 15 via a standard air coupler 22 or the like. The supply line 15 is in communication with a pressured air supply source (not shown.) A muffler formed in accordance with the present invention connects to the exhaust passage 16 using any one of a number of means, depending on the handle configuration of the tool.

Shown in FIG. 1 is a first embodiment of a muffler 30 formed in accordance with the present invention. FIG. 1 is a partial cutaway drawing. The muffler 30 includes an inner tube 32 having proximal end 38 and distal end 40, an outer sleeve or tube 34, and a number of washers 36. In FIG. 1 at the location of the muffler 30, the inner tube 32 is shown in side view, not cross-section. Each washer 36 is preferably annular with a centered circular inner hole. The inner tube 32 is positioned within the area defined by the stacked washer 36 inner holes. The inner tube 32 is formed from a relatively lightweight rigid material, e.g., plastic, metal alloys, steel, etc. The inner tube 32 includes a plurality of holes 42 distributed about the inner tube 32 along its longitudinal length. In the embodiment of FIG. 1, the inner tube proximal end 38 includes outer threads 44 adapted to screw into corresponding threads formed in the exhaust passage 16 near the exhaust opening. Other known attachment means, however, may be used, e.g., adhesive, latches, clamps, snaps, bolts, crosspins, etc.

Still referring to FIG. 1, the washers 36 are similarly sized to one another and are positioned side-by-side so that their inner holes are aligned. The inner tube 32 is located within the area defined by the aligned washer holes. The number of washers 36 extends the length of the inner tube 32 for which there are holes 42. The washers 36 are made of a suitable sound-dampening and/or -filtering material, such as felt, gauze, rubber, foam, fiber, synthetics, etc. The washers 36 should be of a density sufficient to dampen noise, but not dense enough to cause a significant back pressure in the exhaust passage 16. An exemplary, high-density felt washer that has yielded good results is manufactured by All Felt Products of Engleside, Ill., product number F-1 S.A.E. During testing, this washer decreased the noise level by approximately 15 decibels, while causing a back pressure of less than about 2.5 psi, as measured in a standard pneumatic hand tool. In addition, the washers preferably include mold and moisture-resisting chemicals.

Figure 2A:
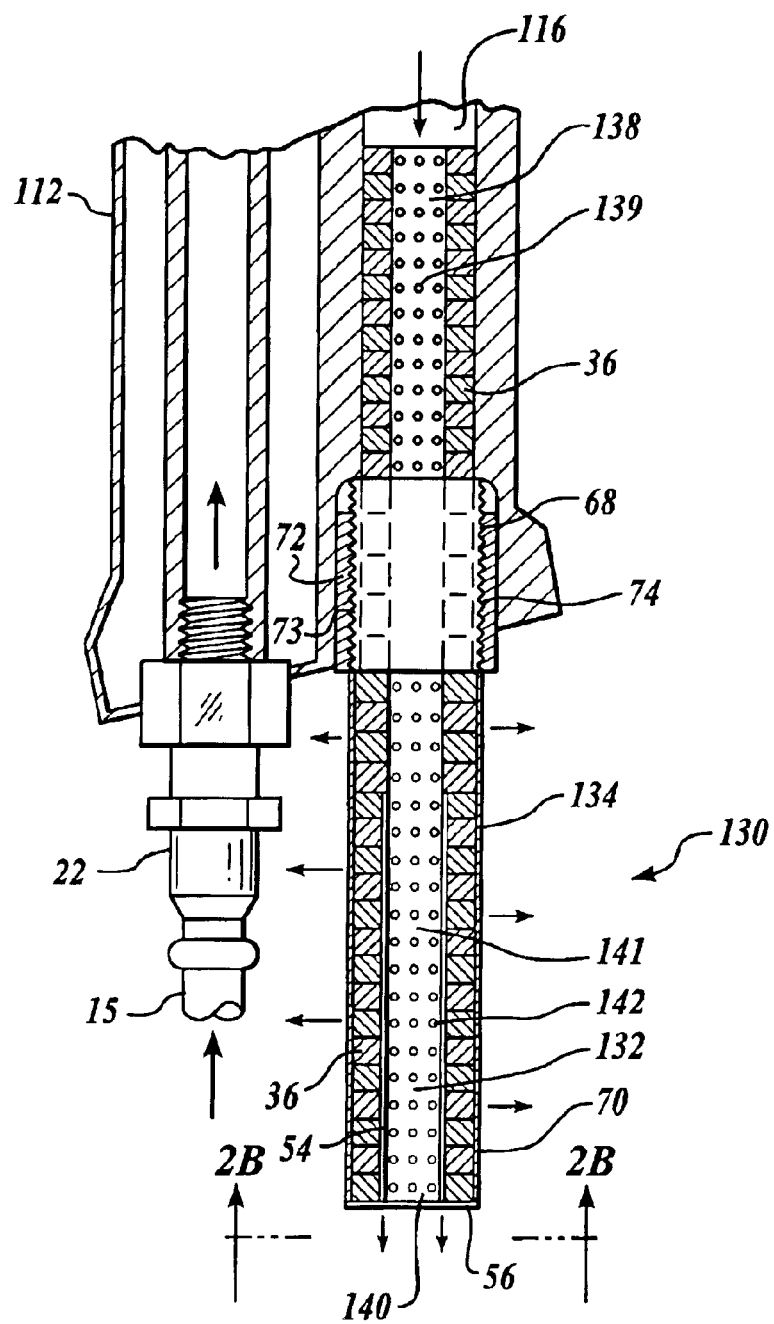
FIG. 2A is a partial cross-sectional side view of a second embodiment of a muffler formed in accordance with the present invention.
Figures 5A, 5B:
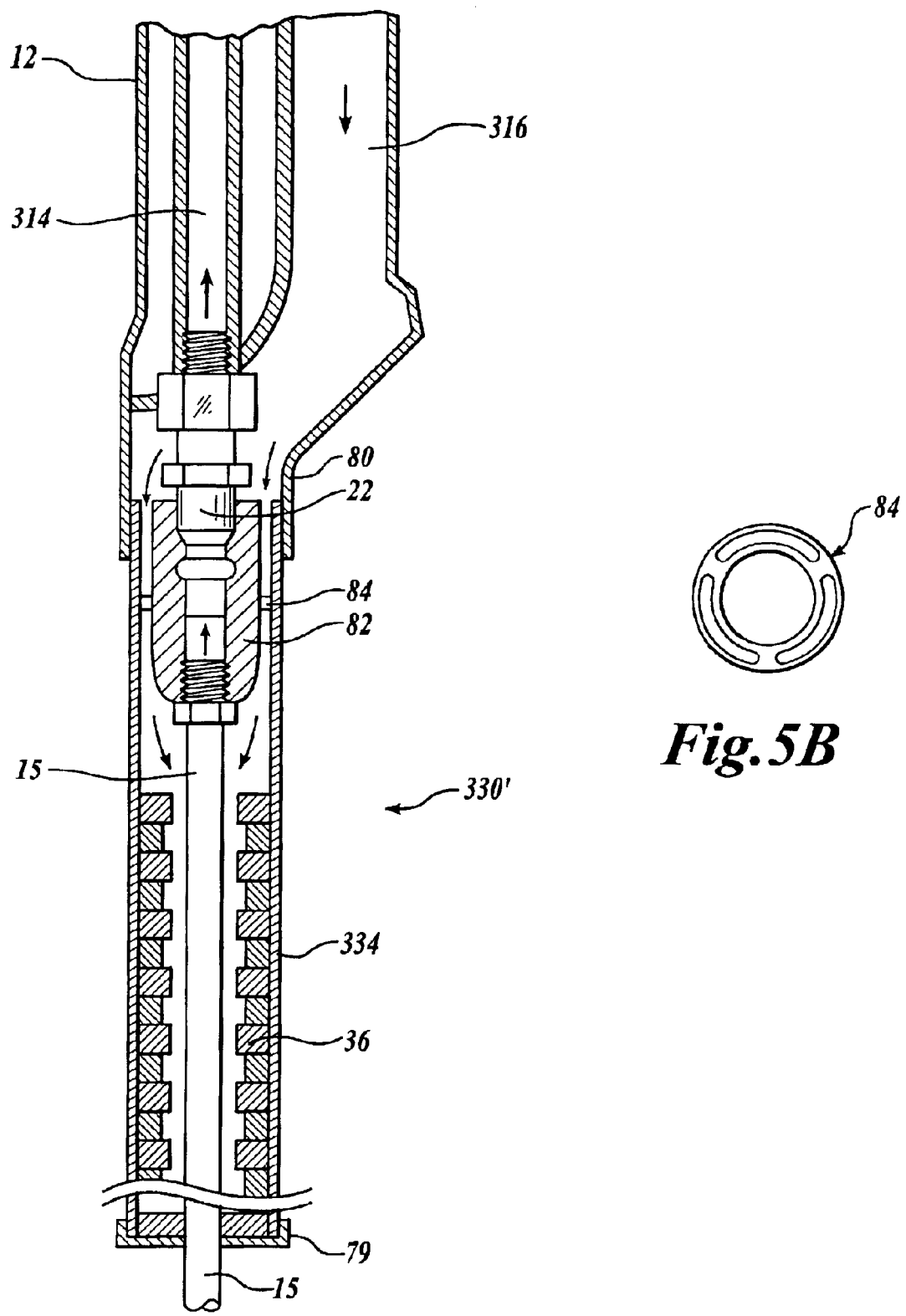
FIG. 5A is a cross-sectional side view of a fifth embodiment muffler formed in accordance with the present invention.
FIG. 5B is a plan view of the distancing washer shown in FIG. 5A.

As shown in FIG. 1, the washer 36 inner hole diameters are all the same size, and the washer 36 outer diameters are all the same size. In general, a muffler formed in accordance with the present invention may include washers 36 of various inner and outer diameters. For example, the configurations of FIGS. 2A and 5A show washers 36 of like outer diameters and varying inner diameters. In addition, the washers 36 may be of varying densities and/or thicknesses. The size, density, and arrangement of the washers 36 will affect the rate at which the exhaust air is slowed, and hence will effect exhaust noise and backpressure. Accordingly, a designer should carefully consider the number, size, density, material, and placement of the washers 36 in the muffler 30.

The combination of washers 36 and inner tube 32 is located within the outer sleeve 34. Referring back to the embodiment of FIG. 1, the outer sleeve 34 is sized to contact the outer perimental surfaces of the washers 36. In some embodiments, the outer sleeve 34 is formed from a lightweight flexible fabric that includes air passages. Examples of flexible materials include loose-knit or woven nylon fabric, canvas, polyester, wool, perforated flexible plastic, perforated tape, other synthetic fabrics, perforate sealant, etc. Other embodiments use an outer tube formed from a rigid or semirigid material, e.g., plastic, metal, thick paper, thick foil, etc.

Still referring to FIG. 1, the washers 36 extend along the inner tube 32 between the tube distal end 40 and the inner tube location adjacent the proximal end threads 44. A lower seal or cap 50 closes off the inner tube distal end 40 and the last washer, which is positioned at the distal end 40. An upper seal or cap 50' closes off the end washer near the proximal end 38. Although the caps 50, 50' may be flexible or rigid, they do not allow airflow therethrough in the embodiment of FIG. 1. During use, exhaust air enters the inner tube proximal end 38 from the exhaust passage 16, travels down the inner tube 32 and outward through the inner tube holes 42 and into the washers 36. At the washers 36, the exhaust is slowed and the exhaust noise is consequently reduced. The exhaust air then travels radially out the washers 36 and through the outer sleeve 34 air passages and to the atmosphere. As will be appreciated from viewing FIG. 1, the caps 50, 50' on the first and last washers force the exhaust air to travel radially outward through the washers 36.

Figure 2B:
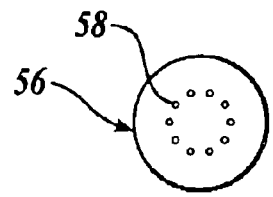
FIG. 2B is a plan view of a lower cap shown in FIG. 2A.

Shown in FIGS. 2A and 2B is a second embodiment of a muffler 130, formed in accordance with the present invention. FIG. 2A is also a partial cutaway drawing. At the location of the handle 112 and the muffler 130, the inner tube 132 and the lower end cap 56 and annular member 72 are shown in side view, not in cross-sectional side view. Similar to the first embodiment, the second embodiment also includes an inner tube 132 having proximal end 138 and distal end 140, and a plurality of holes 142 therethrough. The inner tube 132 further includes a first portion 139 and a second portion 141. The first portion 139 is located near the inner tube proximal end 138. The second portion 141 is located near the inner tube distal end 140. The holes 142 are located at least along the length of the inner tube second portion 141. The first portion 139 is surrounded by a plurality of similarly sized, stacked, circular washers 36. The combination of the first portion 139 and its respective washers 36 is positionable within the exhaust passage 116 via the exhaust opening. The outer diameters of these washers 36 are preferably sized to contact the surface of the exhaust passage 116 inside the handle 112.

The second portion 141 is surrounded by washers 36 and an outer sleeve 134. The outer sleeve 134 includes first end 68 and second end 70. The outer sleeve first end 68 is located between the inner tube proximal end 138 and distal end 140. The outer sleeve second end 70 is located near the inner tube distal end 140. The outer sleeve first end 68 is formed as a rigid annular member 72 that includes a threaded outer surface 73. As shown in FIG. 2A, the handle exhaust opening includes mating threads 74 adapted to engage the outer sleeve first end threaded outer surface 73. The mating threads 74 may be formed from a nut that is inserted in the exhaust opening, formed integrally at the exhaust opening during manufacture of the handle 112, formed at the opening after formation of the handle 112, or formed using any other methods available for creating threading. The mating threads 74 of FIG. 2A are provided by a cylindrical nut that is glued, cemented, or heat welded to an existing handle exhaust opening. What is important to the second embodiment of the present invention is that the nut be securely attached to the handle 112 so that it will not move during use of the hand tool.

Still referring to FIG. 2A, washers 36 of differing densities are arranged alternatingly along the inner tube 132. In addition to density variations, some of the washers along the inner tube second portion 141 have a larger inner diameter than other of the washers. This provides a passage 54 for exhaust air to travel in addition to passage out the washers. The second embodiment muffler 130 includes a perforated lower end cap 56 shown in plan view in FIG. 2B. The perforated lower cap includes a ring of holes 58 positioned to align with the passage 54 during use.

Figure 3B:
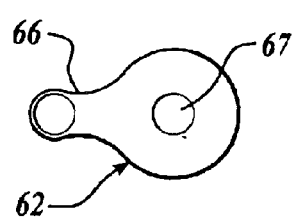
FIGS. 3B and 3C are plan views of upper and lower fittings shown in FIG. 3A.
Figure 3C:
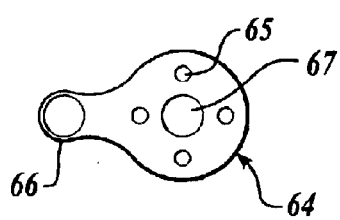
Figure 3A:
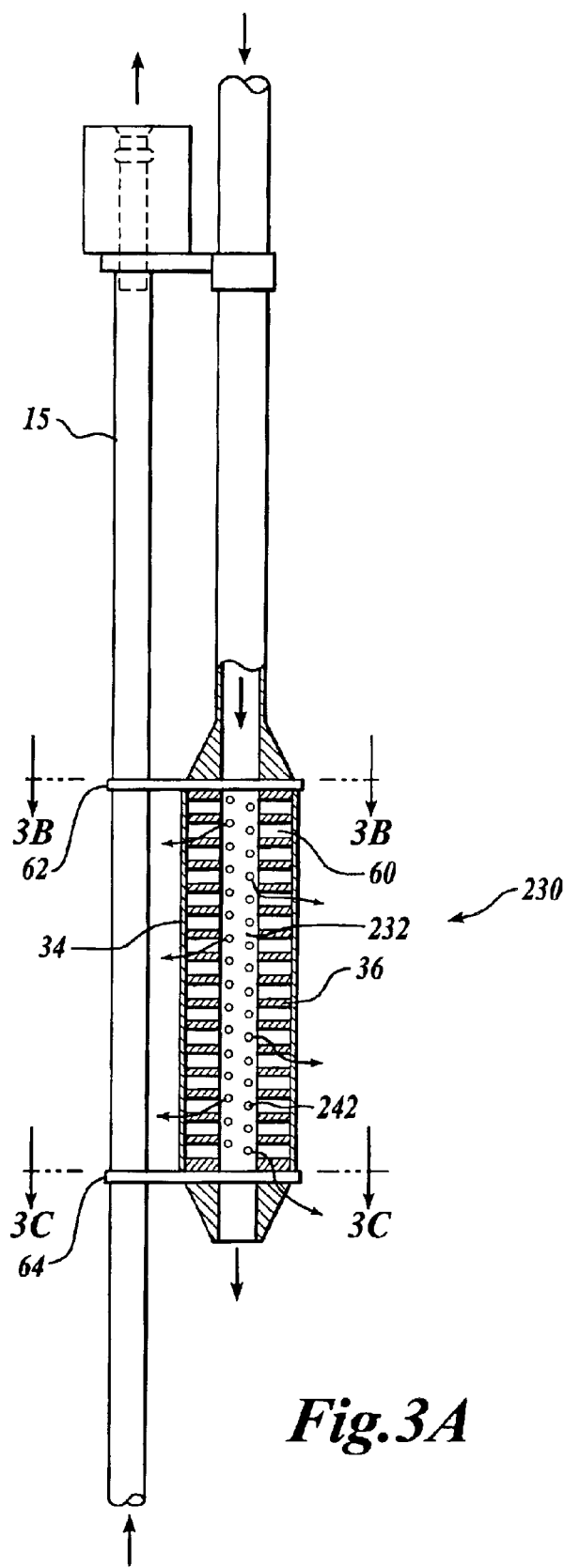
FIG. 3A is a cross-sectional side view of a third embodiment of a muffler formed in accordance with the present invention.

A third embodiment of a muffler 230 formed in accordance with the present invention is shown in FIGS. 3A–3C. FIG. 3A is a partial cutaway drawing. At the location of the muffler 230, the inner tube 232 and the support fittings 62 and 64 are shown in side view, not in cross-sectional side view. Referring particularly to FIG. 3A, this embodiment is similar to the first embodiment except that the inner tube 232 is of a significantly longer length so that the inner tube holes 242 and washers 36 are correspondingly located farther from the hand tool (not shown). In addition, longitudinal spaces 60 are left between the washers. This arrangement provides noise reduction with even less amounts of back pressure than in either the first or second embodiments.

Upper and lower support fittings 62, 64 are used to cap the first and last washers 36. Both the upper and lower support fittings 62, 64 include a central hole 67 through which the inner tube 232 extends. Both fittings 62, 64 additionally include an arm 66 adapted to attach to an air supply line 15. The attachment to the supply line 15 helps to steady and support the muffler 230 during use. As shown in FIG. 3C, the lower support fitting 64 includes a number of openings 65 that allow airflow therethrough.

Figure 4A:
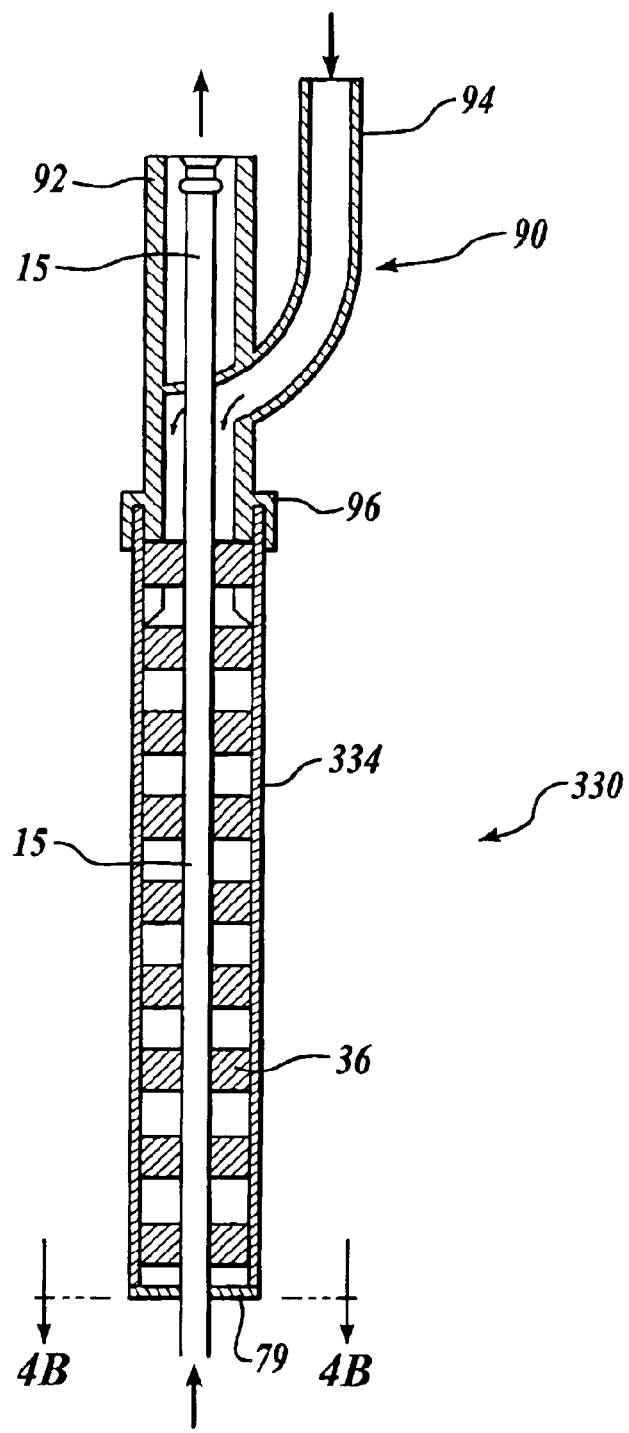
FIG. 4A is a cross-sectional side view of a fourth embodiment of a muffler formed in accordance with the present invention.
Figure 4B:
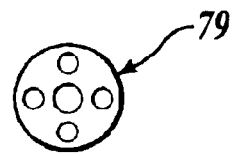
FIG. 4B is a view of an end cap taken along lines 4B—4B of FIG. 4A.

Fourth and fifth embodiments of a muffler 330, 330' formed in accordance with the present invention are shown in FIGS. 4 and 5. These embodiments further stabilize the muffler by forming the muffler about the supply line 15. In the fourth embodiment of FIGS. 4A and 4B, the handle exhaust opening is separate from the intake opening, similar to the handle configuration shown in FIG. 1. In the fifth embodiment of FIGS. 5A and 5B, the handle is formed to cause the exhaust passage 316 to surround the air intake passage 314. In general, both the fourth and fifth muffler embodiments include a perforate outer sleeve 334 surrounding a plurality of washers 36. There is no inner tube—instead, the washers 36 are disposed about the air supply line 15. The mufflers 330, 330' are closed at their distal ends using a sealant or capping means 79 that may include perforations, depending on the flow requirements of a particular application.

Referring to the muffler 330 shown in FIGS. 4A and 4B, a Y-shaped attachment piece 90 is provided to connect the supply line 15 and muffler 330 with the air intake passage (not shown) and the exhaust passage (not shown), respectively (see FIG. 1). The Y-shaped attachment piece 90 has an input arm 92 and an output arm 94 that connect directly to a standard coupler 22 (FIG. 1) and to the exhaust passage 16 at the handle, respectively. The output arm 94 connects with the input arm 92 and surrounds it to form a single combined arm 96. The outer sleeve 334 and washer 36 components attach to the combined arm 96, with the supply line 15 passing through the washer 36 inner holes.

Referring to the muffler 330' shown FIGS. 5A and 5B, the supply line 15 is connected to the intake passage 314 via a standard coupler 22. A portion 80 of the handle exhaust passage is formed to envelop the intake opening and portions of the coupler 22. The muffler 330' proximal end is adapted to connect to this exhaust passage portion 80. The muffler proximal end includes a coupler mating piece 82 and a rigid distancing washer 84. The mating piece 82 is held in the outer sleeve 34 by the distancing washer 84. The coupler mating piece 82 receives the standard coupler 22 at one end and connects to the air supply line 15 at the other end. The coupler mating piece 82 is of a smaller outer diameter so exhaust air is forced to pass around it and the supply line 15 and into the muffler washers 36.

Figure 6A:
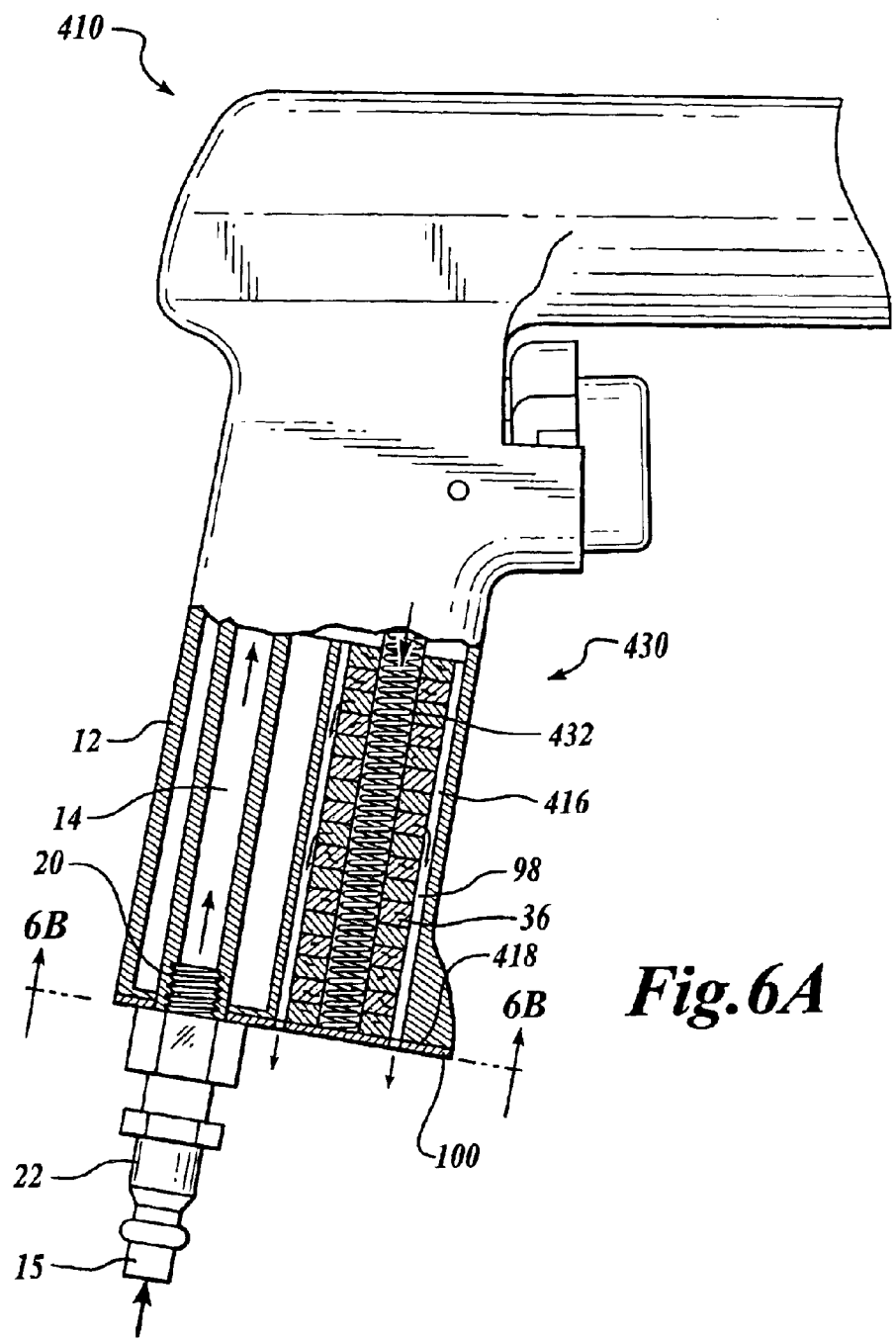
FIG. 6A is partial cross-sectional side view of a sixth embodiment of a muffler formed in accordance with the present invention.
Figure 6B:
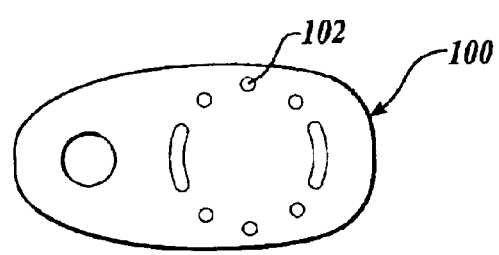
FIG. 6B is a plan view of a lower cap taken along lines 6B—6B of FIG. 6A.

Shown in FIGS. 6A and 6B is a sixth embodiment of a muffler 430 formed in accordance with the present invention. The muffler 430 includes an inner tube 432 and a number of washers 36. The inner tube 432 is preferably formed as a spring. FIG. 6A is a partial cutaway drawing. At the location of the muffler 430, the inner tube 432 is shown in side view, not in cross-sectional side view. The inner tube 432 is positioned within the area defined by the stacked washer 36 inner holes. When using a spring inner tube 432, the coil thickness and the number of coils per a given length can be tailored to give a particular desired airflow rate. The spring inner tube 432 may be in compression, in tension, or otherwise unloaded. What is important to the present invention is the airflow rate ensuing from the spring—not necessarily the compressive capability of the spring. Therefore, other spring-like shapes may be used.

In the embodiment of FIG. 6A, the combination of washers 36 and inner tube 432 is inserted directly into the air exhaust passage 416. The interior surfaces of the air exhaust passage 416 act as an outer tube. The washers 36 are sized to provide an airflow passage 98 between the peripheral edge surfaces of the washers 36 and the air exhaust passage 416 sidewall surfaces. An end cap 100 is provided to close off the exhaust passage 416 at the handle bottom surface 418. The cap 100, shown in FIG. 6B, includes one or more openings 102 through which exhaust gas may exit the hand tool 410. It is preferable that the cap 100 does not include openings that align directly with the inner tube 432, so that exhaust gas will pass from the inner tube 432 laterally outward through the washers 36, before exiting the hand tool 410. During use, exhaust air passes from the hand tool 410 through the inner tube 432, out the washers 36, and through the passage 98 to the openings 102 in the end cap 100.

Figure 7:
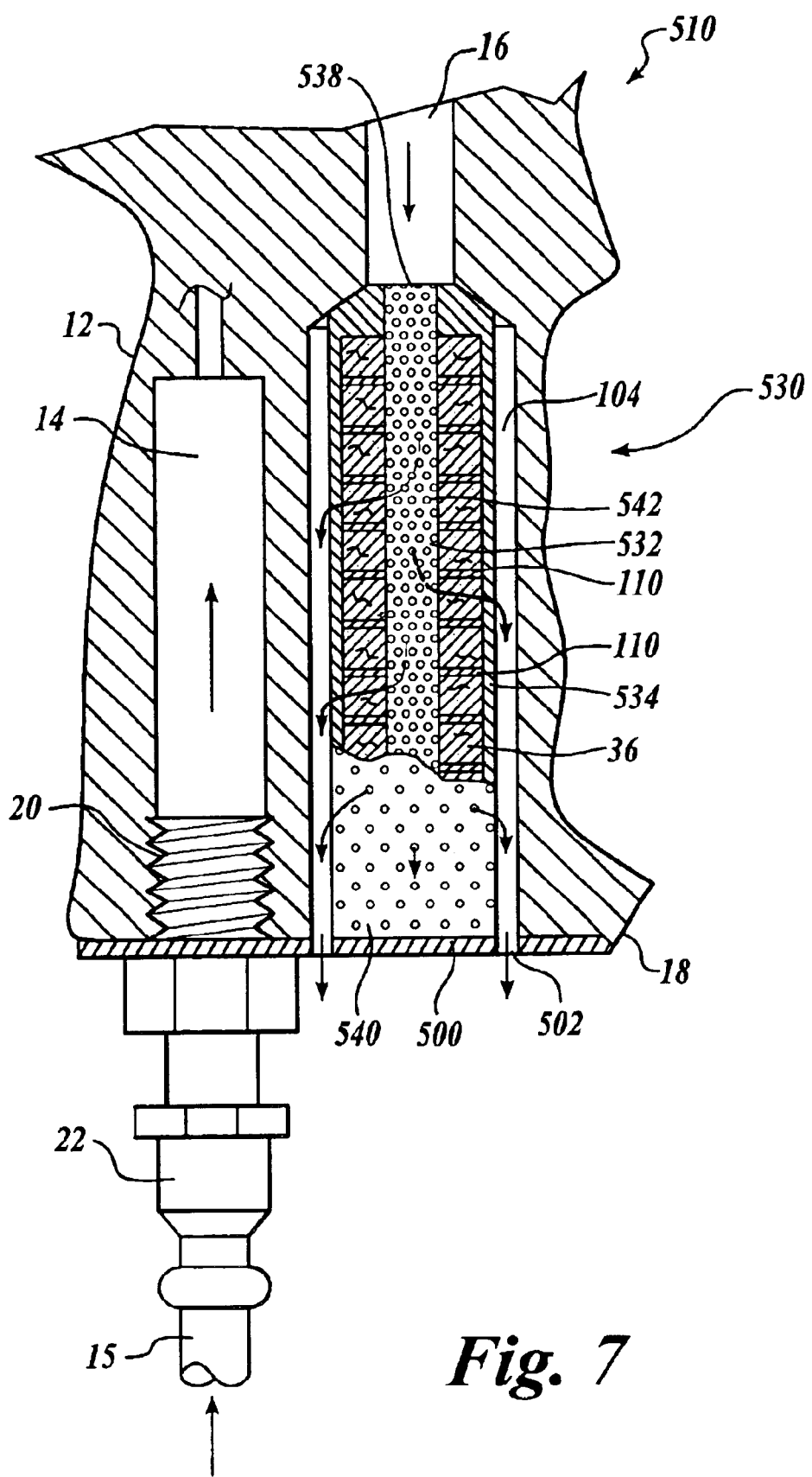
FIG. 7 is a partial cross-sectional side view of another embodiment of a muffler formed in accordance with the present invention.

Shown in FIG. 7 is another embodiment of a muffler 530 formed in accordance with the present invention. The muffler 530 includes an inner tube 532 having a plurality of holes 542 and a number of washers 36 stacked about the inner tube 532. Individual dividers 110 are located between the washers 36. Each divider 110 includes an inner diameter sized to contact the inner tube 532 and an outer diameter sized to contact the interior surface of the outer sleeve 534. The inner tube 532 is open at its proximal end 538 and closed at its distal end 540. The inner tube 532 and washers 36 are held within an outer sleeve 534, located within the main section 104 of the exhaust passage. The outer sleeve 534 includes a number of airflow openings. The outer sleeve 534 is sized smaller than the main section so that a passage is available for exhaust airflow.

The outer sleeve 534, shown in FIG. 7, is a rigid member formed of a lightweight plastic and having a plurality of holes 542 positioned along the entire outer tube length. Other arrangements are possible. As before, what is important to this embodiment of the present invention is that the combination of components provides sufficient filtering and noise dampening without disrupting efficient operation of the tool 510. An end cap 500, similar to the end cap 100 shown in FIG. 6B, is provided across the bottom of the handle 12. The end cap 500 includes a number of openings 502 that, in the embodiment of FIG. 7, are at locations outward of the outer sleeve 534.

In the embodiment of FIG. 7, a cutoff wall (not shown) is located at the distal end of the inner tube. During use, exhaust air is directed from the handle exhaust passage 16 into the open inner tube proximal end 538. The cutoff wall forces exhaust air to flow out the holes 542 of the inner tube 532 and into the adjacent washers 36. The dividers 110 force the exhaust air to travel laterally through each washer 36. The exhaust air exits the muffler via the outer sleeve 534 airflow openings. In this embodiment, the dividers 110 provide a barrier to prohibit exhaust air from moving vertically between washers 36. The exhaust air exits the handle 12 via the end cap 500 openings 502.

Figure 8:
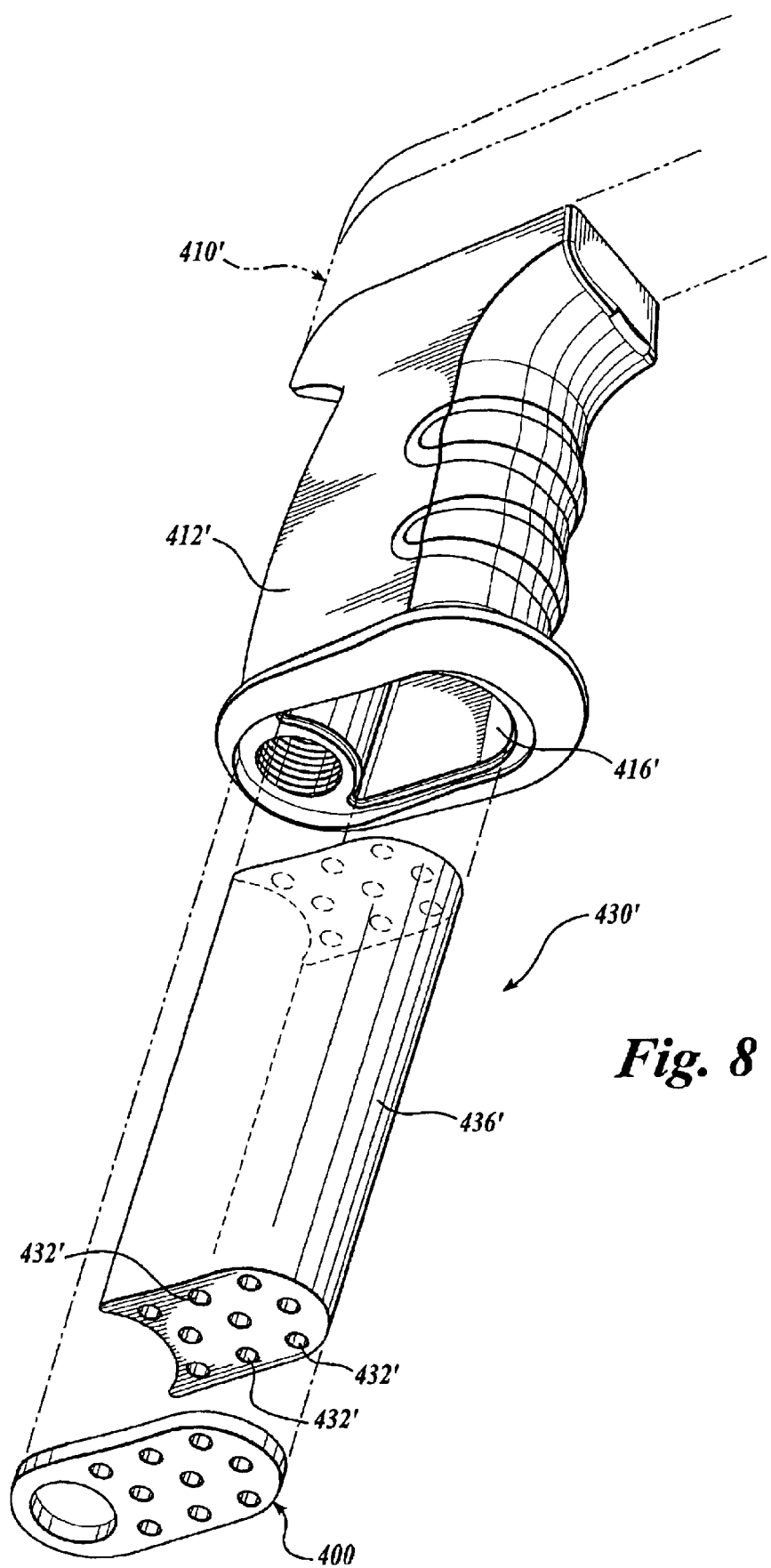
FIG. 8 is a perspective view of another embodiment of a muffler formed in accordance with the present invention, utilizing a rod of sound absorbing material.

FIG. 8 shows another embodiment of a muffler 430' according to the present invention, similar to the muffler 430 shown in FIG. 6, but wherein a plurality of longitudinal apertures 432' extends through an elongate rod 436' of sound-suppressing material, rather than a single, centrally-disposed aperture defined by the stacked washers 36 (FIG. 6A). The rod 436' is disposed in an exhaust passage 416' in the handle 412' of a hand tool 410'. The rod 436' of sound suppressing material may be made from, for example, felt, gauze, rubber, foam, natural, or synthetic fibrous materials, or the like. The apertures 432' extend generally longitudinally through the rod 436', although they may be inclined or non-linear therethrough. The rod 436' may be formed as a unitary block of material, or may comprise a plurality of stacked elements that cooperatively form the rod 436'. It will also be appreciated that the rod 436' may have a peripheral dimension that is smaller than the inner dimension of the exhaust passage 416' in the handle, thereby also providing a peripheral passageway for the exhaust air.

A perforated cap plate 400' is attached to the handle 412' below the rod 436', holding the rod 436' therein, and providing a port for the exhaust to leave the handle.

Figure 9:
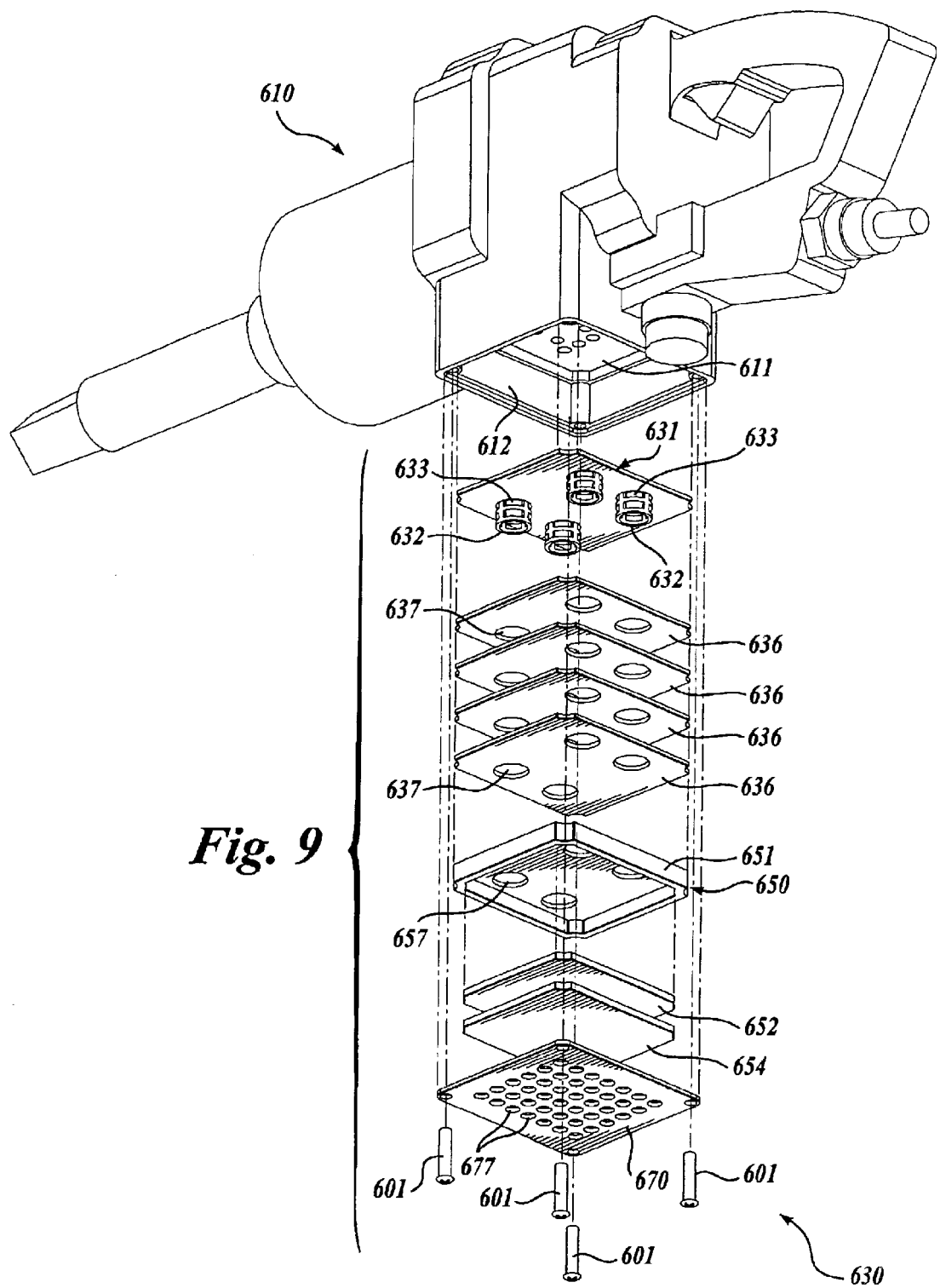
FIG. 9 is an exploded side view of a hand tool incorporating another embodiment of a muffler according to the present invention.
Figure 10:
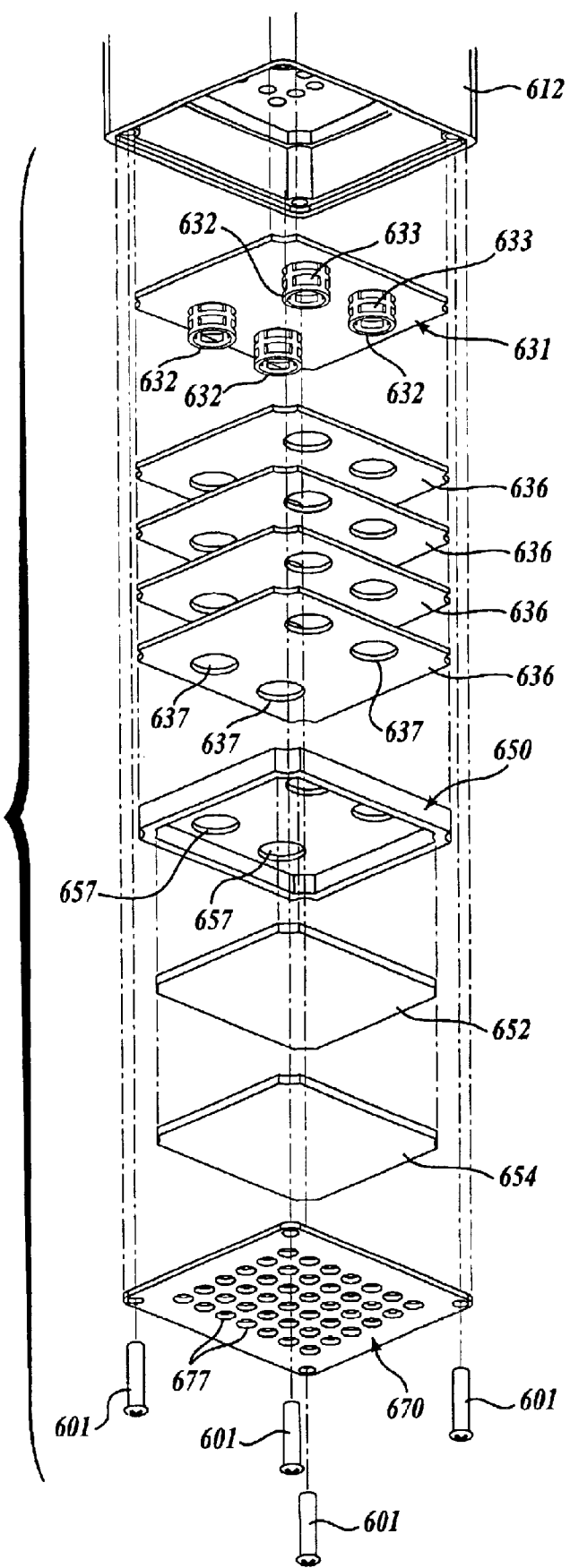
FIG. 10 is an exploded perspective view of the muffler components shown in FIG. 9.
Figure 11:
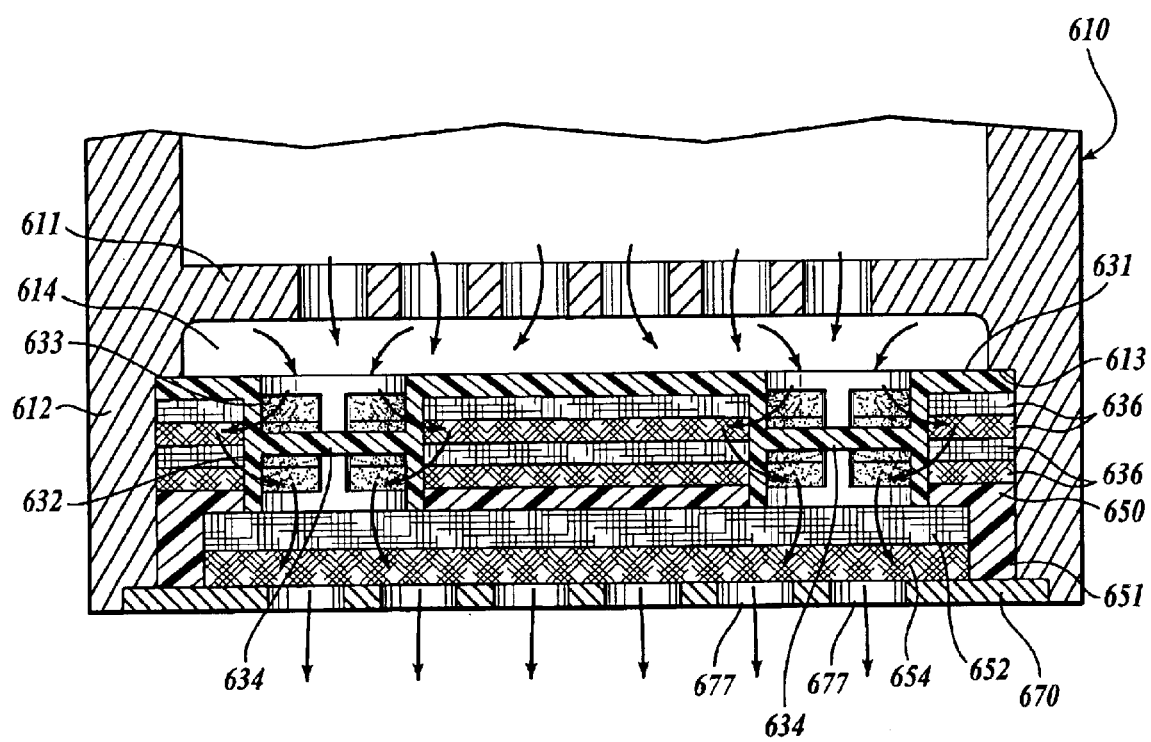
FIG. 11 is a cross sectional side view of the muffler assembly shown in FIG. 9, showing the general airflow pattern through the muffler.

FIGS. 9–11 show an embodiment of the present invention particularly suited to pneumatic hand tools 610 having a "D-type" side handle. FIG. 9 shows a hand tool 610 having an internally disposed exhaust vent 611, with a volume defined by a peripheral wall portion 612 extending therefrom. A muffler assembly 630 shown in exploded view is disposed in the volume defined by the wall portion 612. The muffler assembly 630 includes a rigid or semirigid support plate 631 having a plurality of downwardly disposed tubes 632. A plurality of sound-deadening panels 636 is disposed below the support plate 631. The sound-deadening panels 636 include apertures 637 that are sized and spaced to slidably engage the tubes 632 of the support plate 631, such that the sound-deadening panels 636 are substantially retained by the support plate 631 as shown in FIG. 11.

The tubes 632 extending from the support plate 631 include outwardly oriented apertures 633, as seen most clearly in FIG. 11, and are open at the top and bottom of the tubes 632. A transverse blocking plate 634 is disposed part way down the length of the tubes 632, blocking the flow path between the open top and bottom of the tubes 632.

The sound-deadening panels 636 may be made of any material, such as a dense felt, as described for the washers 36, above. Although a plurality of substantially rectangular panels is preferred, as shown in FIGS. 9–11, it is also contemplated by the present invention that the sound-deadening panels 636 may be of any other suitable shape. For example, annular washer members may be utilized about individual tubes 632, or a plurality of smaller, coplanar elements may be utilized to form the panels 636. It is preferred that the sound-deadening panels 636 fit snugly within the volume defined by the wall portion 612.

A preferably rigid or semirigid lower panel 650 is disposed below the sound-deadening panels 636, substantially blocking vertical airflow from the bottom of the stack of sound-deadening panels 636. The lower panel 650 includes a plurality of apertures 657, substantially aligned with the apertures 637 in the sound-deadening panels 636—that is, generally aligned with the tubes 632. The lower panel 650 includes a peripheral rim 651 that is sized to receive one or more porous diffuser panels 652, 654. The preferred embodiment includes a first diffuser panel 652 made from a loosely bound fabric such as a spacer fabric, and a second diffuser panel 654 made from a denser fabric, such as felt or the like. The diffuser panels 652, 654 are disposed generally below the lower panel 650, and fit snugly within the peripheral rim 651.

An external exhaust vent 670 comprising a preferably rigid plate having a plurality of apertures 677 therethrough, attaches to the hand tool 610, generally at the distal end of the wall portion 612, enclosing the other muffler elements within the volume defined by the wall portion 612. The exhaust vent 670 may be attached to the wall portion 612 with screws 601, or any other suitable attachment mechanism.

The operation of this novel pneumatic muffler assembly 630 can now be appreciated. The exhaust gas from the pneumatic motor (not shown) exits the motor compartment through the internal exhaust vent 611, as indicated by the arrows in FIG. 11. In the preferred embodiment the wall portion 612 includes a peripheral shoulder 613 that holds the muffler assembly 630 and, in particular, the support plate 631, away from the internal exhaust vent 611, forming a narrow plenum volume 614. The support plate 631 directs the exhaust gasses into the open upper end of the tubes 632. The blocking plates 634 in the tubes 632 direct the exhaust through the upper portion of the outwardly oriented apertures 633 and into the sound-deadening panels 636. The lower panel 650 further directs the exhaust back into the lower portion of the apertures 633, and then downwardly into the diffuser panels 652 and 654. The exhaust then exits the muffler assembly 630 through the apertures 677 in the external exhaust vent 670.

Although the particular embodiment of the muffler assembly 630 disclosed herein includes four tubes 632 in a rectangular array, it is contemplated that more or fewer tubes may be utilized. Moreover, the tubes 632 may include more than one blocker plate to produce a more serpentine flow path through the sound-deadening panels 636. Also, the tubes may be of different shape than that shown in the disclosed embodiment, including, for example, rectangular cross-sections and/or tapering or expanding profiles. Similarly, although four sound-deadening panels 636 and two diffuser panels 652, 654 are disclosed, more or fewer deadening panels and diffuser panels may be utilized. It will also be appreciated that although the preferred embodiment exhausts through an external exhaust vent 670 disposed generally parallel to the internal exhaust vent 611, it is contemplated that a transverse exhaust vent could be provided through the wall portion 612—either in addition to or, alternatively, to the external exhaust vent 670.

As will be appreciated from a reading of the above, the present invention is a compact, lightweight, and easy-to-use device capable of effectively quieting exhaust expelled from a pneumatic hand tool, while causing minimal amounts of back pressure on the pneumatic motor. The present invention may be attached to known hand tools with only minor changes required to the hand tool.

Figure 12:
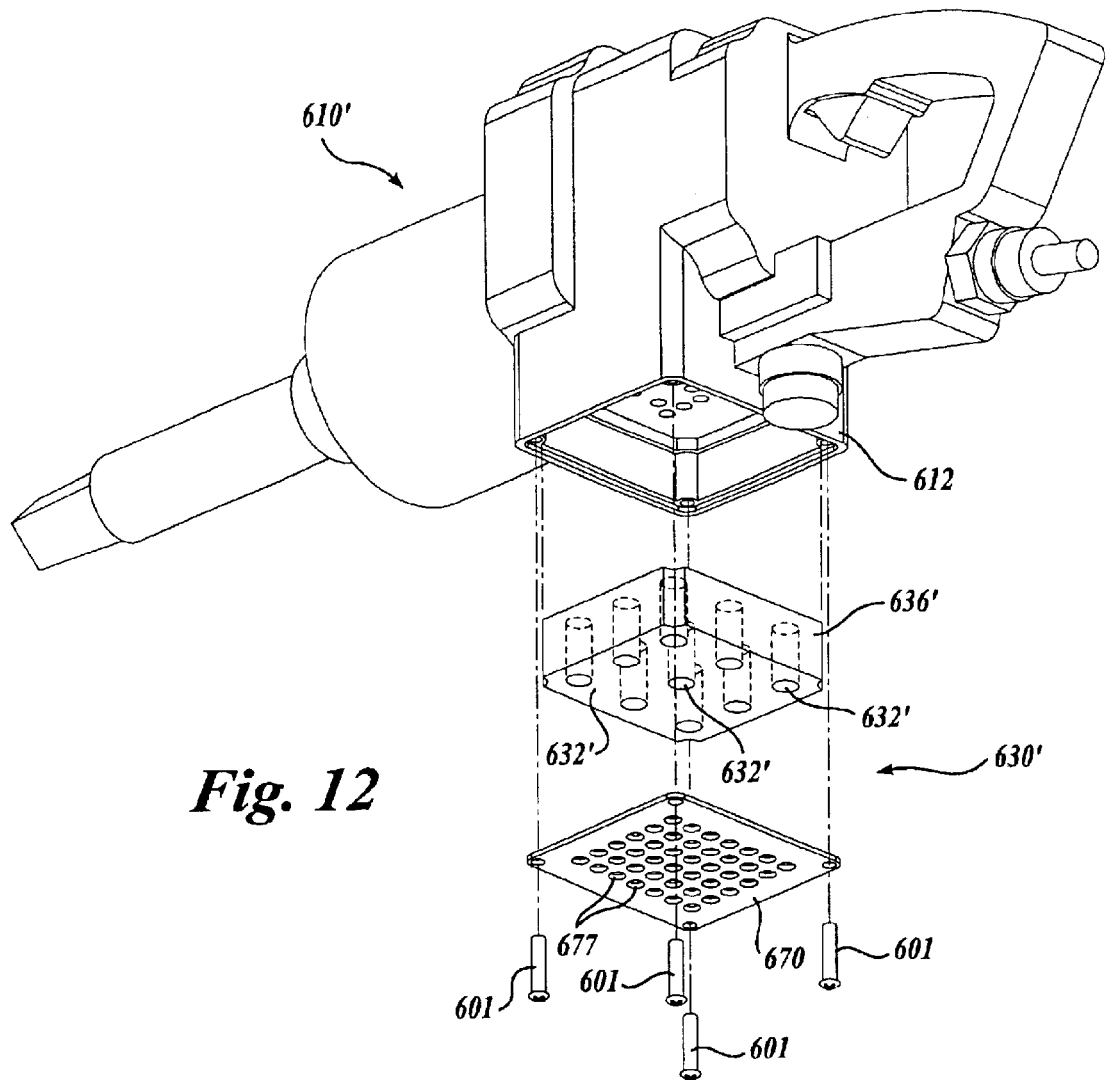
FIG. 12 is a perspective view of another embodiment of a muffler formed in accordance with the present invention utilizing a block of sound absorbing material.

FIG. 12 shows another embodiment of a muffler 630' according to the present invention, similar to the muffler 630 shown in FIGS. 9–11, but wherein a plurality of longitudinal apertures 632' extends through a block 636' of sound-suppressing material, rather than the more complex structure shown in FIGS. 9–11. The block 636' is disposed in the volume defined by the wall portion 612 disposed on a lower portion (as shown in FIG. 12) of the hand tool 610'. The block 636' of sound-suppressing material may be made from, for example, felt, gauze, rubber, foam, natural or synthetic fibrous materials, or the like. The apertures 632' extend generally longitudinally through the block 636', although they may be inclined or nonlinear therethrough. The block 636' may be formed as a unitary block of material, or may comprise a plurality of stacked elements that cooperatively form the block 636'. It will also be appreciated that the block 636' may have an peripheral dimension that is smaller than the inner dimension of the volume defined by the wall portion 612, thereby also providing a peripheral passageway for the exhaust air.

A perforated cap plate 670 is attached near the distal end of the wall portion 612 below the block 636', for example, with machine screws 601. The cap plate 670 includes a plurality of apertures 677 providing a port for the exhaust to leave the tool 610'. The cap plate 670 also retains the block 636' in place. It will also be appreciated that this embodiment may include a lower panel 650 and/or diffuser panels 652, 654 as shown in FIGS. 9–11.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A muffler assembly for a pneumatic hand tool having a first exhaust outlet, the muffler assembly comprising:
    a peripheral wall extending distally from the first exhaust outlet and defining an open distal end, the peripheral wall defining a volume, wherein the volume receives exhaust from the first exhaust outlet;
    an upper plate adapted to fit snugly within the volume, the upper plate having a plurality of apertures;
    a plurality of tubes, each tube extending distally from one of the upper plate apertures, each tube having an open proximal end, an open distal end, a sidewall having a plurality of apertures therethrough, and a blocking element disposed between the proximal end and the distal end of the tube;
    a sound-deadening panel having a plurality of apertures, which apertures are sized and positioned to slidably engage the plurality of tubes and the sound-deadening panel is shaped to fit snugly within the volume defined by the peripheral wall; and
    a perforated exhaust plate adapted to engage the distal end of the peripheral wall, thereby closing the distal end of the volume.

2. The muffler assembly of claim 1, wherein the sound-deadening panels comprise a plurality of stacked panels.

3. The muffler assembly of claim 2, wherein at least one of the stacked panels is made of a felt material.

4. The muffler assembly of claim 1, wherein the upper plate and plurality of tubes are formed as a unitary structure.

5. The muffler assembly of claim 1, further comprising a lower plate disposed below the sound-deadening panel, the lower plate having a plurality of apertures, each aperture disposed in proximity to at least one of the plurality of tubes.

6. The muffler assembly of claim 5, further comprising at least one diffuser panel disposed below the lower muffler plate.

7. The muffler assembly of claim 5, wherein the upper panel is adapted to direct the exhaust received from the first exhaust outlet into the plurality of tubes, and the blocking element in each of the plurality of tubes is adapted to direct the exhaust into the sound-deadening panel.

8. The muffler assembly of claim 5, wherein the upper panel is formed from a plastic material.

9. The muffler assembly of claim 5, wherein the sound-deadening panels comprise a plurality of stacked panels.

10. The muffler assembly of claim 9, wherein each stacked panel is of unitary construction.

11. A muffler assembly comprising:
- a peripheral wall defining a volume having a proximal end that is adapted to receive an exhaust stream, and an open distal end;
- an upper plate adapted to slidably engage the peripheral wall, the upper plate having a plurality of apertures;
- a plurality of tubes, each tube extending distally from one of the upper plate apertures, each tube having an open proximal end, an open distal end, a sidewall having a plurality of apertures therethrough, and a transverse blocking element disposed between the proximal end and the distal end of the tube;
- a sound-deadening panel having a plurality of apertures that is adapted to slidably engage the plurality of tubes, the sound-deadening panel shaped to fit within the volume defined by the peripheral wall; and
- an exhaust plate adapted to engage the distal end of the peripheral wall, thereby closing the distal end of the volume.

12. The muffler assembly of claim 11, wherein the sound-deadening panels comprise a plurality of stacked panels.

13. The muffler assembly of claim 12, wherein at least one of the stacked panels is made of a felt material.

14. The muffler assembly of claim 11, wherein the upper plate and plurality of tubes are formed as a unitary structure.

15. The muffler assembly of claim 11, further comprising a lower plate disposed below the sound-deadening panel, the lower plate having a plurality of apertures, each aperture disposed in proximity to at least one of the plurality of tubes.

16. The muffler assembly of claim 15, further comprising at least one diffuser panel disposed below the lower muffler plate.

17. The muffler assembly of claim 15, wherein the upper panel is adapted to direct the received exhaust stream into the plurality of tubes, and the blocking element in each of the plurality of tubes is adapted to direct the exhaust into the sound-deadening panel.

18. The muffler assembly of claim 15, wherein the upper panel is formed from a plastic material.

19. The muffler assembly of claim 15, wherein the sound-deadening panels comprise a plurality of stacked panels.

20. The muffler assembly of claim 19, wherein each stacked panel is of unitary construction.

* * * * *